US005085473A

United States Patent [19]

Yang

[11] Patent Number: 5,085,473
[45] Date of Patent: Feb. 4, 1992

[54] AIR ACTUATED CAR CURTAIN DEVICE
[75] Inventor: De Q. Yang, Miami, Fla.
[73] Assignee: Yuhe Yang, N. Miami, Fla.
[21] Appl. No.: 594,589
[22] Filed: Oct. 9, 1990
[51] Int. Cl.⁵ .................................................. B60J 3/02
[52] U.S. Cl. ................................. 296/141; 296/97.4; 296/97.8; 160/370.2; 160/238
[58] Field of Search ............... 296/97.4, 97.8, 98, 296/141; 160/370.2, 311, 238, 264

[56] References Cited

U.S. PATENT DOCUMENTS

| | | | |
|---|---|---|---|
| 3,363,666 | 1/1968 | Hadgson et al. | 296/97.4 |
| 4,171,845 | 10/1979 | Hirsch | 296/97.4 |
| 4,202,396 | 5/1980 | Levy | 296/97.7 |
| 4,652,039 | 3/1987 | Richards | 296/97.7 |
| 4,707,018 | 11/1987 | Gavagan | 296/97.8 |
| 4,758,041 | 7/1988 | Lebeur | 296/97.8 |
| 4,762,358 | 8/1988 | Levosky et al. | 296/97.8 |

Primary Examiner—Robert R. Song
Attorney, Agent, or Firm—J. Sanchelima

[57] ABSTRACT

An air-actuated curtain device for covering the windshield and windows of a vehicle for the purpose of blocking the rays of the sun. The device activates the spring loaded roll-on curtains through compressed air that is forced through a distensible element that is perpendicularly positioned on the curtain sheets with respect to their respective mandrels. The air compressor is controlled by a timer, or a pressure switch, that permits to operate a sufficient amount of time, or reach a predetermined pressure limit, to fully distend the curtain sheets. Upon release of the pressurized air, the curtain sheets come back to their initialed rolled state. Air pressure release valves are used to manually and automatically release the air in the conduits when it exceeds a given pressure.

7 Claims, 3 Drawing Sheets

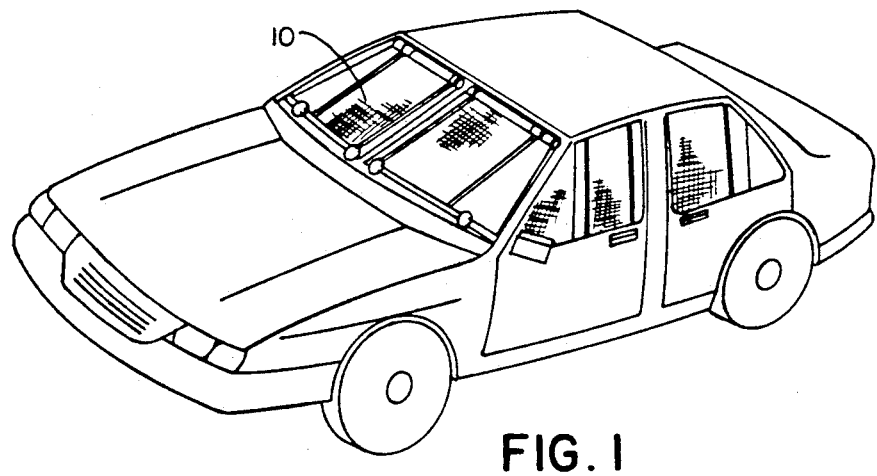
FIG. 1
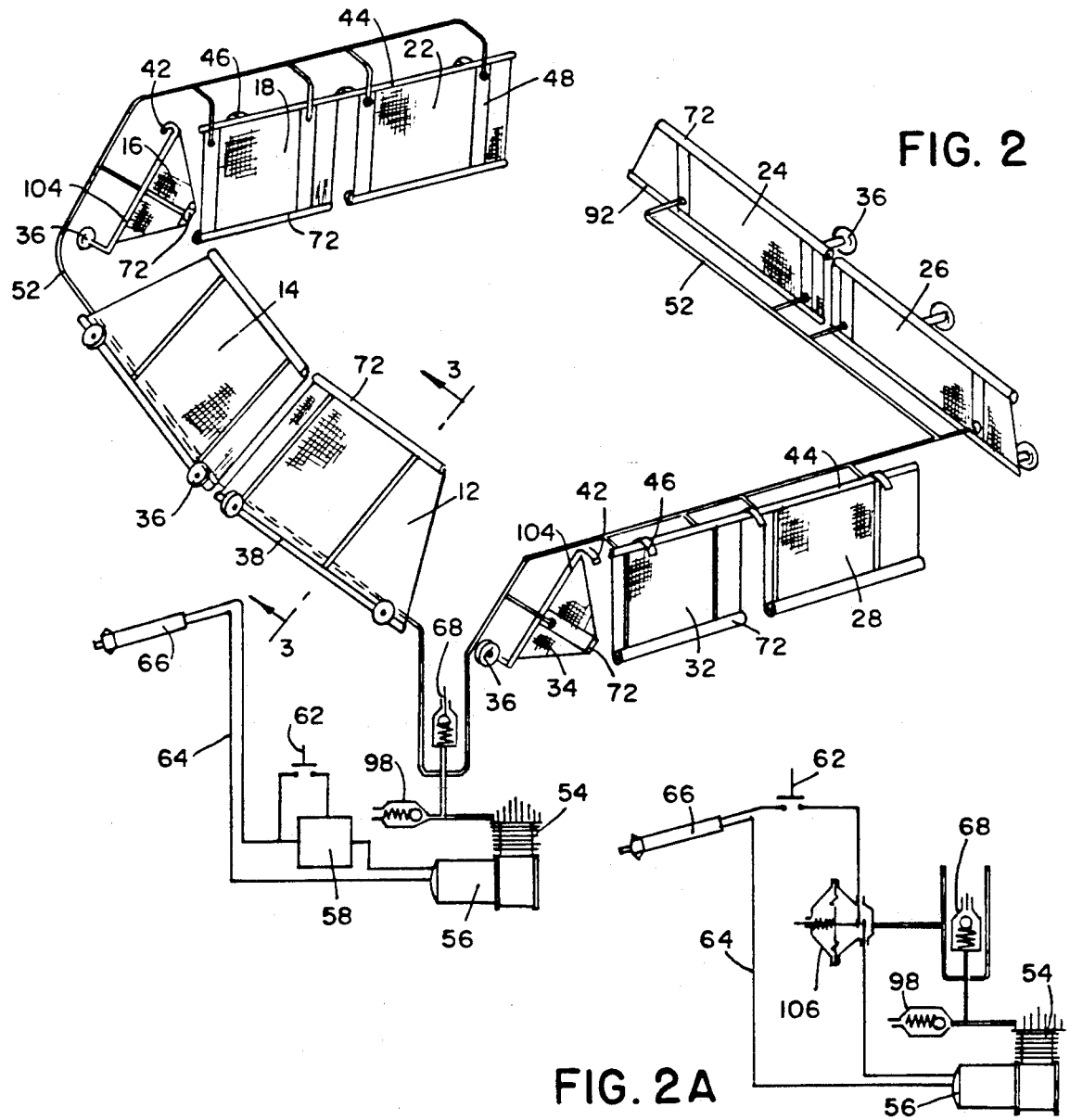
FIG. 2
FIG. 2A

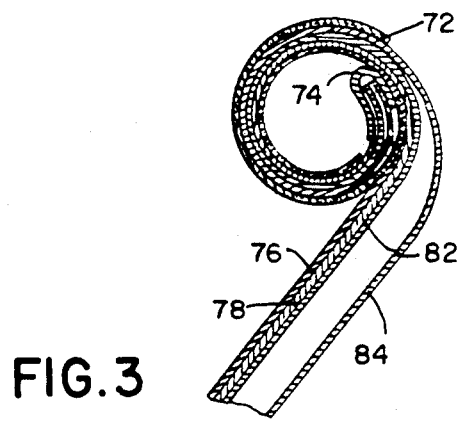
FIG.3
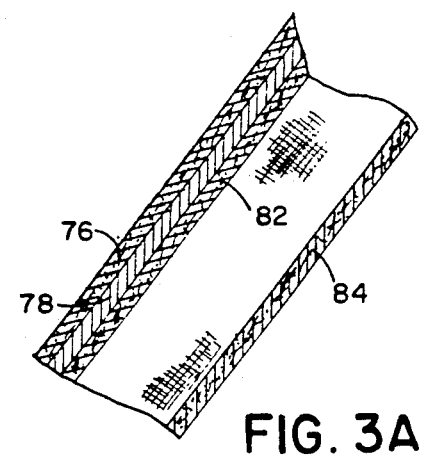
FIG. 3A
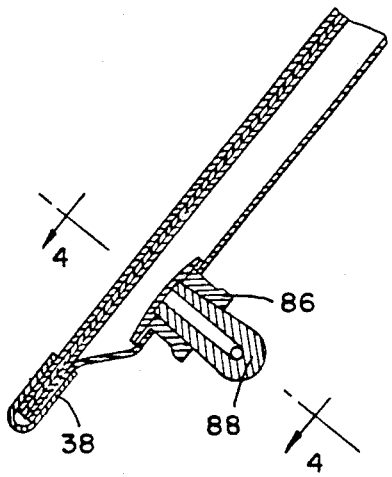
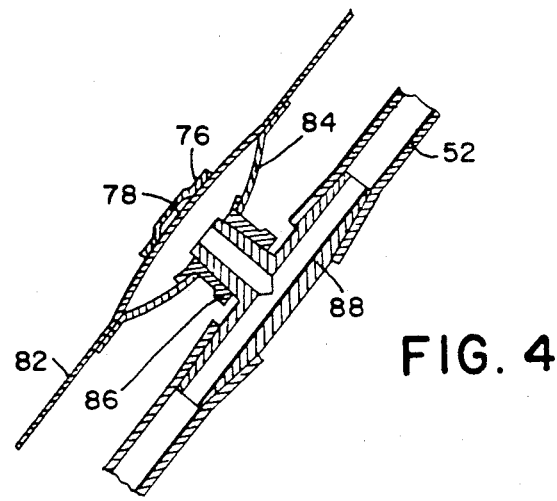
FIG. 4
FIG. 5
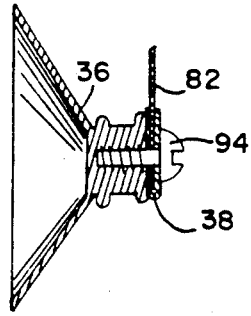
FIG. 6
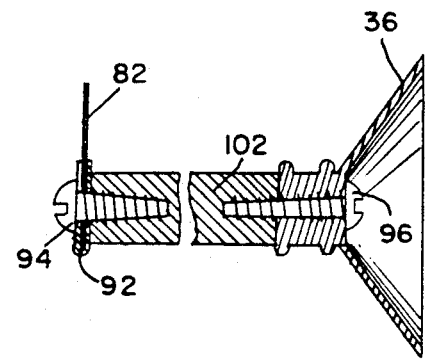

AIR ACTUATED CAR CURTAIN DEVICE

BACKGROUND OF THE INVENTION

1. Field of the Invention

The present invention relates to an air-actuated curtain device for vehicles designed to block the solar radiation, and more particularly, to such a device that can be removably secured in the interior of vehicles. This device can shade the interior of the vehicle from the hot rays of the sun.

2. Description of the Related Art

While a substantial number of devices have been designed in the past to minimize the effect of the solar rays in vehicles, particularly when they are parked, none of the references found by the Applicant have anticipated the features described and claimed below. Representative references correspond to U.S. Pat. No. 4,202,396 issued to Levy and U.S. Pat. No. 4,652,039 issued to Richards. These windshield shades require their manual installation by a user. They differ from the present invention because they are not practical and require considerable storage space. Also, both of these patent references refer to windshields only and not to windows.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device that can readily cover the windshield and windows in general in a vehicle.

It is yet another object of the present invention to provide a device to cover a vehicle's windshield and windows through the use of pressurized air in distensible air duct members.

It is yet another object of this present invention to provide such a device that is inexpensive to manufacture and maintain while retaining its effectiveness.

Another object of this invention is that this curtain device can be installed in the vehicle with absolutely no damage to the interior of the vehicle.

It is still another object of this invention to provide a distensible air duct member for closing windows and windshields that self-adjusts to the dimensions of these openings.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a view in perspective of the air-actuated curtain device installed in a vehicle and in its stretched out position.

FIG. 2 shows the air-actuated curtain device in its stretched out position with a schematic representation of the electrical circuit that powers the pneumatic pump used in the present invention.

FIG. 2A shows an alternative electrical circuit, in which, an adjustable pressure switch is used instead of the timer shown in FIG. 2.

FIG. 3 illustrates a sectional view of a distensible air duct member air duct member member taken along line 3—3 in FIG. 2.

FIG. 3A is an enlarged detailed view of a portion of FIG. 3.

FIG. 4 is a representation of sectional view taken along 4—4 in FIG. 3.

FIG. 5 shows the relative position of the suction cup with respect to the support bar.

FIG. 6 shows the relative position of the suction cup with respect to the rear support bar with a stud between them.

DETAILED DESCRIPTION OF THE PREFERRED EMBODIMENT

Figure 7:
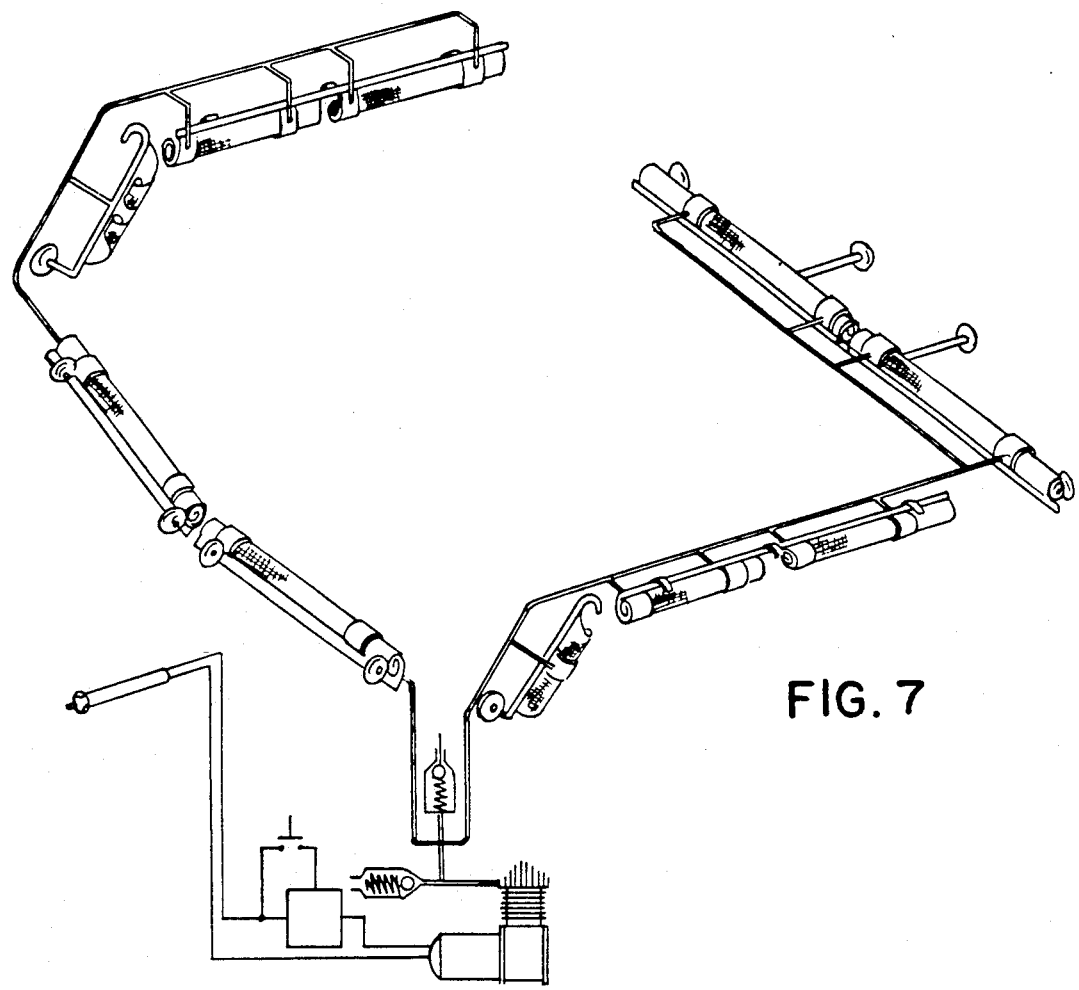
FIG. 7 is a view of one of the preferred embodiments for the airactuated curtain device in its rolled up position.

Referring now to FIG. 1, where the present invention is generally referred to with numeral 10, it can be observed that is installed in a vehicle at its stretched out position. All windows and the windshield have been substantially covered thereby protecting the interior of the vehicle from the action of the sun.

In FIG. 2, different shapes and sizes of curtains can be observed. The dimensions of the curtains are dictated by the specifics of the vehicle's openings intended to be protected. For example, numerals 12 and 14 correspond to the windshield curtains, 16 and 34 are triangular curtains, 18, 22, 28, and 32 are side curtains, and both 24 and 26 are rear window curtains. All the curtains represented in FIG. 2 are in their stretched out position.

Both triangular windows near the windshield at the front end of the vehicle are covered by triangular curtains. Each triangular curtain is supported by a support bar 104 which is hooked to the molding of the cornice near the ceiling of the vehicle by a hook 42 at the top of the support bar and secured to the windshield by a suction cup 36 at the bottom of the support bar.

A small low pressure air compressor 54 is used to stretch out and to support the curtains by pumping compressed air into distensible air duct members 48. When air is released from distensible air duct members, curtains are rolled to small rolls by spiral springs, which are attached to distensible air duct members 48.

Distensible air duct members 48, when filled with air, become rigid enough to distend the curtains they are attached to. As shown in FIG. 2 and FIG. 7, each curtain has preferably two distensible air duct members 48, except the triangular curtains, for which one distensible air duct member is sufficient.

Support bars 38; 44; 92; and 104 are made out of a rigid material, such as plastic, aluminum, etc., and they serve as structural support for the curtains. Suction cups 36 are used to secure the windshield curtains 12 and 14 and rear curtains 24 and 26 to the inside of the windshield and rear window, respectively. Hooks 42 are used to hang the top end of the triangular curtains on the moldings of the cornices near the decorative material of the ceiling. Suction cup 36 are used to secure the bottom portion of the triangular curtains onto the windshield. Hooks 46 are used to hang the side curtains on the moldings of the cornices near the decorative material of the ceiling. Actually, hooks 42 and 46 are inserted into the seams between moldings of the cornices and the decorative material of the ceiling.

Air conduit 52 is used to connect all distensible air duct members with air compressor 54. Air compressor 54 is a small low pressure air compressor used to pump air into distensible air duct members 48 to stretch out the curtains. D.C. motor 56 is used for driving the air compressor, in the preferred embodiment. D.C. motor 56 is used to drive air compressor 54. Plug 66 can be plugged into any vehicle cigarette lighter to supply the power for the D.C. motor 56. Switch assembly 62 is preferably a momentary switch that activates electric timer device 58 which in turn activates D.C. motor 56 for a sufficiently long predetermined period of time so that enough air is pumped into distensible air duct members 48 making them rigid enough to stretch out thereby rolling out the curtains. Electric timer device 58 is readily adjustable depending on the characteristics of the device and the environment where the invention is being used. It is possible that at higher altitudes, such as on a mountain, a longer time is required to inflate distensible air duct member 48. Also, depending on the dimensions of the openings the pump time will have to be adjusted accordingly. It is also possible to shut air compresor 54 by an adjustable pressure switch 106, as shown in FIG. 2A, pre-set at a predetermined limit. Relief valve 68 can be hand operated to release air in distensible air duct members 48. Plug 66 can be plugged into a cigarette lighter receptacle (not shown) to supply power to D.C. motor 56 through wires 64. A safety valve 98 is provided to automatically prevent excess air pressure built in distensible air duct members 48.

FIGS. 3; 3A and 4 illustrate one of the embodiments for the structure of distensible air duct member 48. Windshield curtain 12 is shown in its stretched out position. Distensible air duct member 48 is formed by curtain sheet member 82 and a strip 84. Spiral spring member 78 is tightly wound at itself at rest state. Sprial spring member 78 is secured to curtain cover 82 by the bonding piece 76. Parts 76, 82 and 84 are made out of a material that is air tight, flexible, temperature resistant and light weight, such as fiber reinforced plastic meterial or the like. Bonding piece 76 is welded to curtain cover 82, and strip 84 is welded to curtain cover 82 with both enough strength and air tight. If plastic is used as material, then 76, 82 and 84 can be welded by heating and pressing. Other suitable processes could be used for the specific material selected.

As shown in FIG. 3, the support bar 38 and an end bar 74 hold the bonding piece 76, the spiral spring member 78, the curtain cover 82 and the strip 84 tightly together at both ends of the curtain, respectively. A roll-shaped plastic sheet 72 serves as a mandrel for the curtain to roll up over it. Compressed air is pumped by an air compressor through the air conduit or tubing 52, which is tightly held on the T-tube connector 88, which is inserted into socket 86, and socket 86 is welded onto the strip 84. Both 86 and 88 are made of soft plastic for the purpose of ensuring easy connection and air tight.

When air is released from the distensible air duct members, the curtain will be rolled up tightly on the mandrel 72 by the action of spiral spring 78. When the curtain has been completely rolled up to a small roll, the roll is very close to the support bar 38.

In FIG. 5, there is a suction cup 36 bonded to the front support bar 38 by screw 94; in FIG. 6, there is a suction cup bonded to the rear support bar 92 by screws 94 and 96 with stud 102 between them as a spacer. The reason to use the long stud for the rear curtains is to avoid interference of the curtain with the brake light which is usually located near the rear window.

Figure 8:
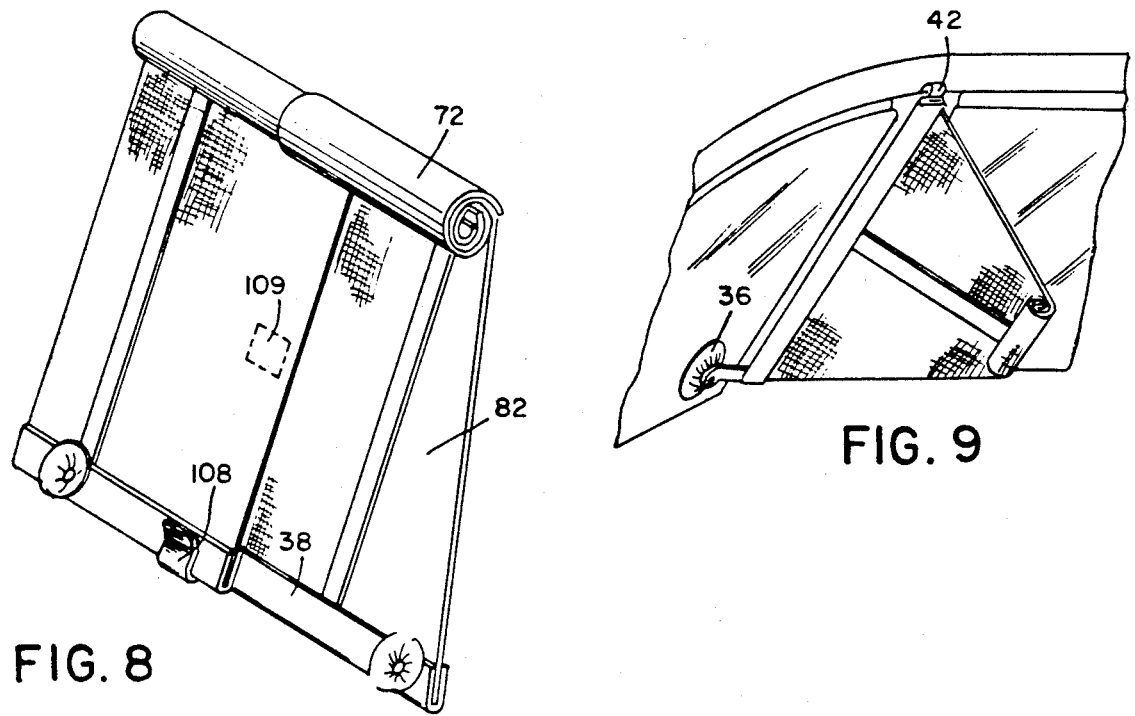
FIG. 8 shows two overlapped curtains illustrating how protection can be achieved in vehicles windows of different dimensions with one standard curtain size.
Figure 9:
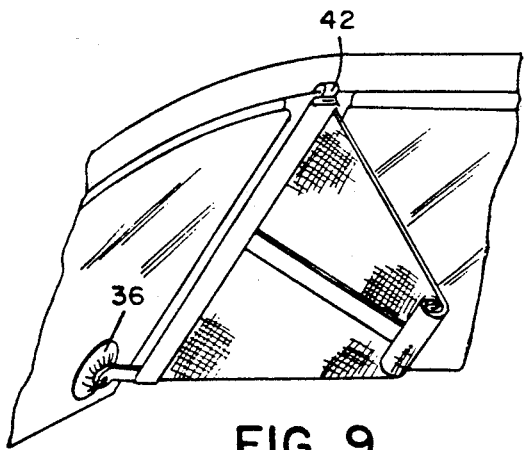
FIG. 9 shows how the suction cup and hook of a triangular curtain are mounted inside a vehicle.

In FIG. 8, it is illustrated how a standard size of curtain sheets 82 is used to cover openings (windows or windshields) of different dimensions. In this case, a relatively large window required the use of two curtain sheets 82. Spring clip member 108 and/or Velcro pads 109 are used to maintain the two overlapping curtains 82 substantially closed to each other.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. An air actuated curtain device for vehicles having windshield and windows, comprising:
    A. a plurality of spring loaded roll-on curtain means for covering said windshield and windows with a flexible curtain sheet member and said curtain means including mandrel means, each one of said curtain means having at least one distensible air duct means substantially perpendicularly disposed with respect to said mandrel means and said distensible air duct means includes an air inlet assembly;
    B. a conduit member connected to said air inlet assembly;
    C. air compressor means for supplying compressed air to said distensible air duct means through said conduit means; and
    D. means for powering said air compressor means.

2. The device set forth in claim 1 wherein said plurality of spring loaded roll-on curtain means are removably mounted above said windshield and windows in the interior of said vehicles.

3. The device set forth in claim 2 wherein said means for powering said air compressor means includes an electric motor and an electric power supply.

4. The device set forth in claim 3 wherein said electric motor includes a D.C. motor and said electric power supply is implemented with a battery assembly.

5. The device set forth in claim 3 further including:
    E. safety valve means for preventing the pressure inside said conduit means to exceed a predetermined magnitude.

6. The device set forth in claim 5 further including:
    F. electric timer means for activating said means for powering said air compressor means for a predetermined period of time that is sufficient to distend said distensible air duct means thereby covering said windshield and said windows.

7. The device set forth in claim 5 further including:
    G. pressure switch means for monitoring the pressure inside said distensible air duct member and further including switch means for disconnecting said means for powering said compressor means.

* * * * *